United States Patent [19]

Jarm

[11] 4,074,410

[45] Feb. 21, 1978

[54] LOCK EXTRACTOR

[75] Inventor: Robert L. Jarm, Buffalo Grove, Ill.

[73] Assignee: Credit Industry Associates, Inc., Arlington Heights, Ill.

[21] Appl. No.: 645,321

[22] Filed: Dec. 30, 1975

[51] Int. Cl.[2] .............................................. B23P 19/04

[52] U.S. Cl. ...................................................... 29/265

[58] Field of Search ................. 29/258, 259, 261, 263, 29/265

[56] References Cited

U.S. PATENT DOCUMENTS

| | | | |
|---|---|---|---|
| 1,925,634 | 9/1933 | Hall | 29/261 |
| 3,108,365 | 10/1963 | Dunkerley | 29/265 |

FOREIGN PATENT DOCUMENTS

| | | | |
|---|---|---|---|
| 1,102,052 | 3/1961 | Germany | 29/261 |
| 1,078,959 | 3/1960 | Germany | 29/259 |
| 176,881 | 3/1922 | United Kingdom | 29/261 |
| 420,194 | 11/1934 | United Kingdom | 29/265 |

*Primary Examiner*—James L. Jones, Jr.

*Attorney, Agent, or Firm*—Keil, Thompson & Shurtleff

[57] ABSTRACT

A device for extracting the lock from an automobile ignition lock assembly comprising a collar which has an end adapted to bear against the frame surrounding the lock and a threaded shaft having at one end a means for engaging the lock and at the other end a handle which bears against the other end of said collar in a manner such that the turning of said handle will withdraw said engaging means and attached lock from the ignition lock assembly and surrounding frame.

10 Claims, 11 Drawing Figures

LOCK EXTRACTOR

INTRODUCTION

The present invention relates generally to a device for removing locks and, more particularly, to a device for extracting the lock from an automobile ignition lock assembly.

BACKGROUND OF THE INVENTION

The majority of late-model automobiles are equipped with anti-theft devices which lock the steering wheel in place when the ignition switch is in the "off" position. Therefore, in order to safely drive the automobile when the ignition key is lost or unavailable, it is necessary to completely disassemble the steering column or otherwise extract the lock of the ignition lock assembly so as to permit disengagement of the anti-theft lock.

Although various devices are presently known to locksmiths and automobile repossessors for extracting the ignition lock without disassembling the entire steering column, it has been found that a number of practical problems and drawbacks have been associated with their use. For example, many of such devices are slow and cumbersome to use, are noisy in their operation, or are suited for use with only a limited number of automobile models. Furthermore, many of such devices have a tendency to greatly damage the ignition lock assembly or mar the surrounding steering column or dashboard surfaces in use.

BRIEF DESCRIPTION OF THE INVENTION

The present invention eliminates the above-mentioned problems and drawbacks found with conventional lock extractors by providing an improved device for extracting the lock from an automobile ignition lock assembly. The device comprises a collar which has an end adapted to bear against the steering column or dashboard frame surrounding the lock and a threaded shaft having at one end a means for engaging the lock and at the other end a handle which bears against the other end of the collar in a manner such that the turning of the handle will exert pressure on the lock and cause the engaging means and attached lock to withdraw from the ignition lock assembly and surrounding frame.

Due to its ability to be used without other tools or disassembly and the unique design of the collet which engages the lock, the present invention may be quickly and easily operated to remove the ignition lock. In addition, it may be simply adapted for use on all domestic automobiles and many popular foreign makes without causing damage to either the remaining ignition lock assembly or surrounding steering column and dashboard surfaces.

DESCRIPTION OF THE PREFERRED EMBODIMENT

Figure 1:
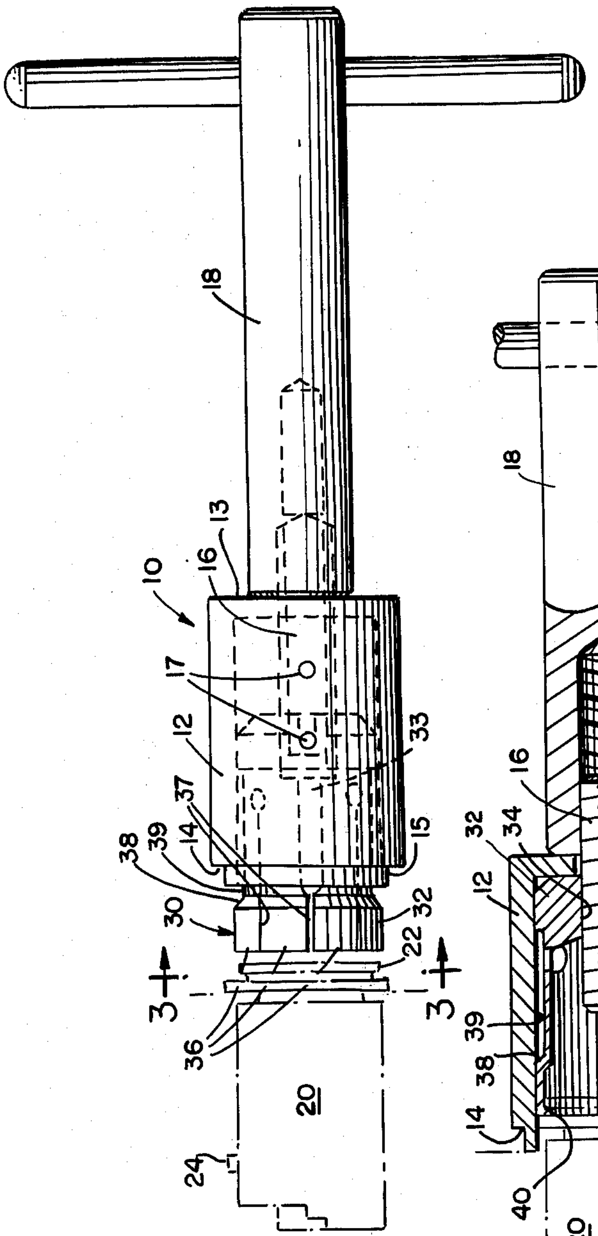
FIG. 1 is a side plan view of a lock extractor constructed in accordance with an embodiment of the present invention.
Figure 2:
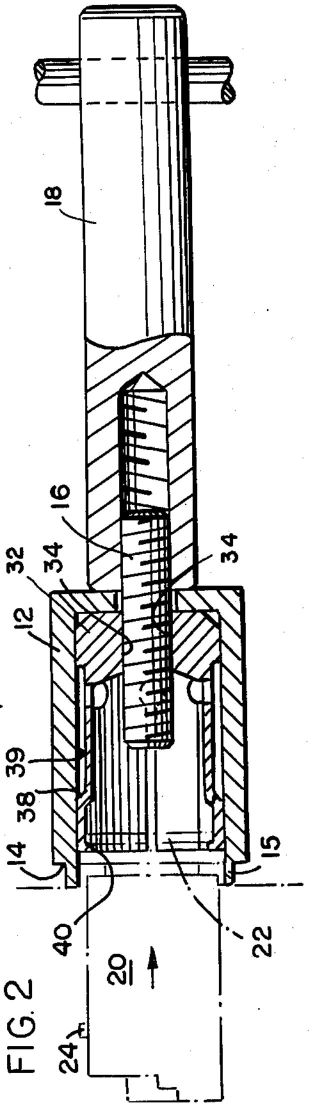
FIG. 2 is a cut-away side view of a portion of the device shown in FIG. 1.
Figure 3:
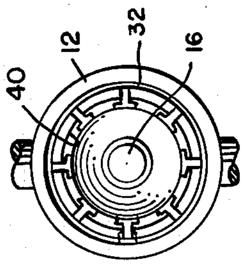
FIG. 3 is an end sectional view taken along line 3—3 of FIG. 1.

FIGS. 1–3 generally illustrate an embodiment of a lock extractor 10 constructed in accordance with the present invention which is particularly useful for extracting lock found in General Motors type vehicles.

The device comprises a hollow cylindrical collar 12 having an end 14 adapted to engage the lock assembly and frame (not shown) surrounding lock 20. A threaded shaft 16 is positioned within the collar which has fixably mounted at one end a handle 18 which bears against the other end 13 of the collar. At the other end of shaft 16 is positioned a means 30 for engaging the lock.

The lock engaging means may consist of a collet 32 which is slidable within collar 12 from extended position as is shown in FIG. 1 to a withdrawn position as is shown in FIG. 2. The collet has an initially threaded portion 34 at one end thereof which engages threaded shaft 16 in a manner such that the turning of handle 18 will cause the collet 32 to withdraw within the collar 12. Pins 17 which extend through collar 12 into a keyway 33 formed in collet 32 prevent the collet from rotating within the collar as handle 18 is turned.

Collet 32 has a plurality of outwardly biased spring teeth 36 separated by slots 37 which extend away from the body of collar 12 and surround and loosely engage the end 22 of lock 20 when in the extended position shown in FIG. 1. When the collet is withdrawn within collar 12 by the action of turning handle 18, end surface 14 which acts as an inner cam edge will engage beveled portion 38 of annular groove 39 formed about the outer surface of teeth 36 which acts as an outer cam surface so as to inwardly compress the teeth about the lock 20. In this manner, internal protrusions 40 formed on the inner end portion of the teeth will tighten about the rear edge of end 22 of lock 20 thereby securely attaching it to collet 32. Due to the arrangement of annular groove 39 and beveled portion 38 of the collet, the spring teeth 36 may be moved from a fully outwardly biased position such as is shown in FIG. 1 to an inward compression position about lock 20 as is shown in FIG. 2 with only a few turns of handle 18.

In operation, the chrome cap (not shown) which generally surrounds end 22 of the lock 20 is removed and the outwardly biased spring teeth 36 are positioned about the lock end in a loose engagement relationship (FIG. 1). Outwardly extending ring portion 15 formed on end 14 of the collar helps to align the collar within the lock assembly about lock 20. Handle 18 is turned, thereby withdrawing collet 32 within collar 12 and tightening spring teeth 36 about lock end 22, until end 14 seats against the surrounding ignition lock assembly frame. Further turning of the handle 18 beyond this point exerts great withdrawing force upon the lock due to the internal leverage created by end 14 bearing against the lock assembly frame. After a few additional turns of the handle, the pins 24 securing the lock within the ignition lock assembly will shear, thereby allowing the lock to be completely removed.

Figure 4:
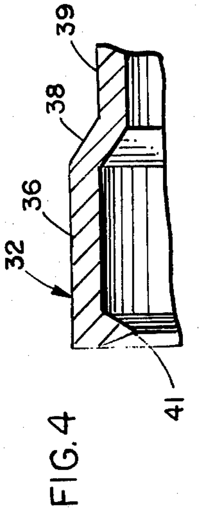
FIG. 4 is an alternate embodiment of a portion of the device shown in FIG. 3.
Figure 5:
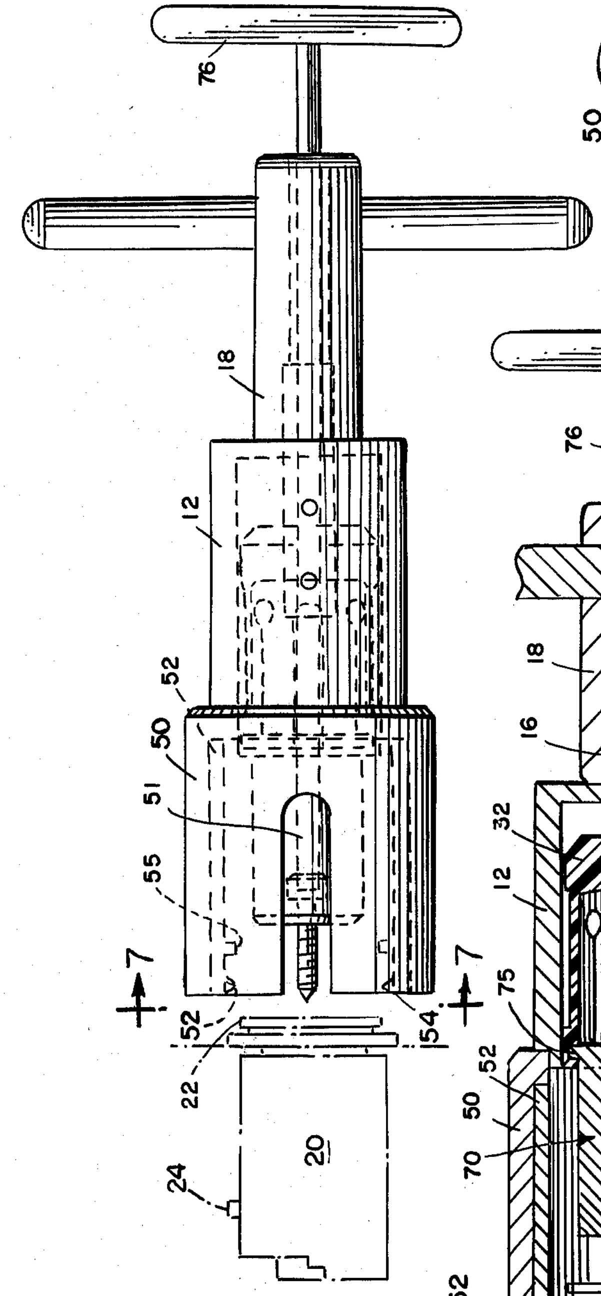
FIG. 5 is a side plan view of an alternate embodiment of a lock extractor constructed in accordance with the present invention.
Figure 6:
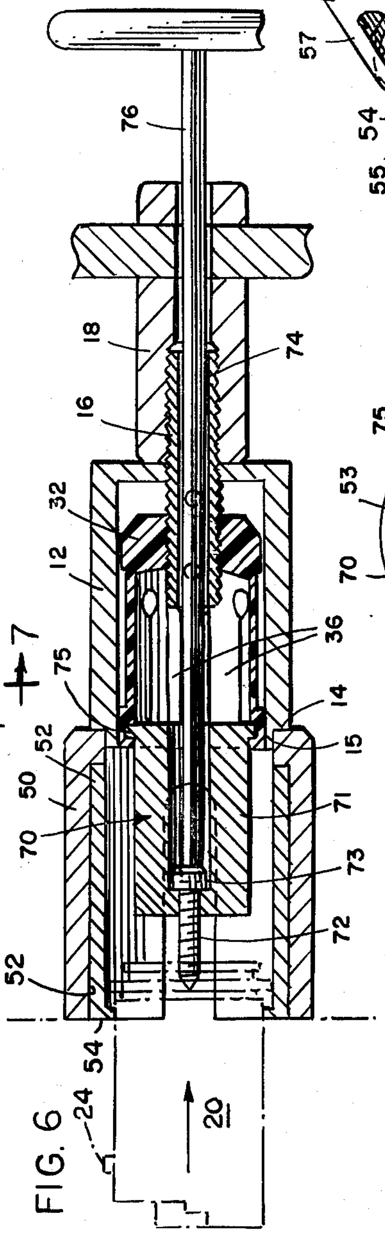
FIG. 6 is a cut-away side view of a portion of the device shown in FIG. 5.
Figure 8:
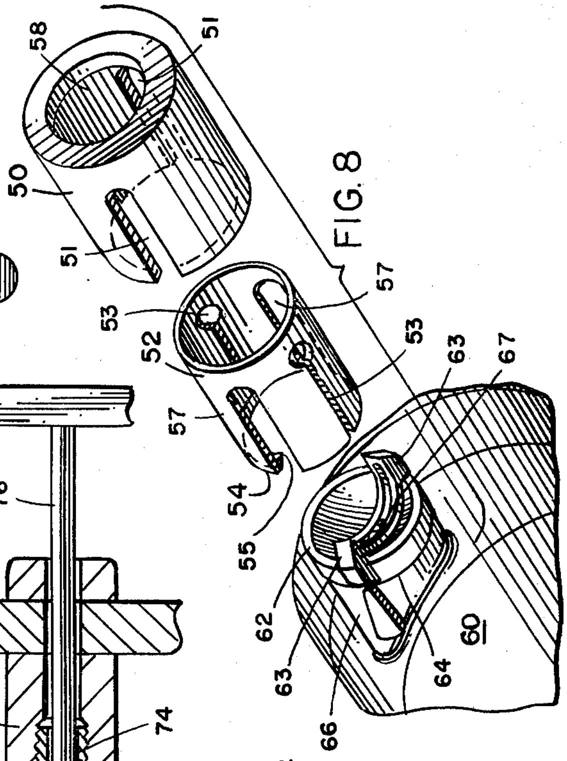
FIG. 8 is an exploded perspective view of a portion of the device shown in FIG. 5.
Figure 7:
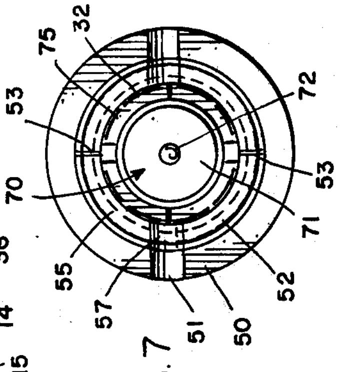
FIG. 7 is an end sectional view taken along line 7—7 of FIG. 5.

FIG. 4 illustrates an alternate embodiment of the collet 32 shown in FIGS. 1–3. As noted above, in operation, internal protrusions 40 formed on the inner end portion of teeth 36 will tighten about the rear edge of end 22 of the lock 20 when handle 18 is turned. However, occasionally the edge of end 22 will shear away from the lock 20 during this operation rather than pins 24 shearing as intended. When this occurs, a specially designed collet having gripping teeth such as shown at 41 in FIG. 4 may be utilized to withdraw the lock. Gripping teeth 41 are designed to cut into the cylindrical side of lock 20 when the collet is withdrawn into the collar of the device so as to allow it to be withdrawn from the lock assembly in the manner described above with respect to the collet of normal design.

An alternate embodiment of the present invention is generally illustrated in FIGS. 5–8 which is designed to extract locks of the type found in Ford Motors vehicles. Collar 12 and collet 32 are identical to those described above and operate in the same manner. However, handle 18 is slightly shorter than that shown in FIG. 1 in order to allow for the extra length of the device added by hollow cylindrical adapter collar 50 being mounted on end 14 of the collar 12.

An outwardly biasable adapter sleeve 52, which may be made of material such as nylon, is removably positioned within adapter collar 50 in a manner such that it cannot be outwardly biased in operation of the device. Adapter sleeve 52 has an end 54 which is constructed so as to engage the ignition lock assembly 60 surrounding the lock 20 and provide the same function as end 14 of collar 12 described in the embodiment above.

In this embodiment of the present invention, a collet adapter 70 is also used in conjunction with collet 32. Collet adapter 70 comprises a hollow plug 71 having a rotatable self-tapping screw 72 mounted therein for engaging the lock. A continuous passage 74 is formed through threaded shaft 16 and handle 18 to permit a means 76 to be inserted therein for engaging and rotating screw head 73. Engaging means 76 may be a commercial hex wrench with handle such as is illustrated in the drawings or any other suitable device such as a simple screwdriver. Collet adapter 70 is securely seated within collet 32 by slightly withdrawing the collet within collar 12 beveled portion 38 is engaged, thereby compressing spring teeth 36 about the end portion 75 of hollow plug 71.

In operation, adapter sleeve 52 is slightly opened at end 54 by outwardly biasing its halves about a pair of key slots 53 formed on opposite sides of the sleeve outer wall so as to permit it to slide over chrome ring 62 which is mounted on end 22 of the lock 20. The adapter sleeve is then closed about the chrome ring so that annular rib 55 formed on its inner surface is positioned in the space 64 between the chrome ring and steering column frame 66. Adapter collar 50 which is preferably made of steel or another rigid material is then placed over the adapter sleeve so as to hold it in place about the chrome ring. Adapter collar 50 and adapter sleeve 52 have a pair of complementary slots 51 and 57 formed in their outer wall surfaces in order to permit ear portions 63 of chrome ring 62 to be withdrawn therein.

After the adapter collar and sleeve are mounted about the chrome ring, ring portion 15 of collar 12 is seated within opening 58 formed in the end of adapter collar 50, and screw 72 is then tapped into the key opening 67 located in lock 20 by rotating the handle of hex wrench 76. Once the screw 72 is securely engaged in the key opening of lock 20, handle 18 is rotated thereby causing the entire collet adapter assembly and attached chrome ring and lock to withdraw within the adapter collar and sleeve. Great withdrawing force is exerted on the lock with this arrangement due to the leverage created by annular rib 55 of the adapter sleeve bearing against steering column frame 66. After a few turns of handle 18, pins 24 securing the lock within the ignition lock assembly will shear, thereby allowing it to be removed.

Figure 9:
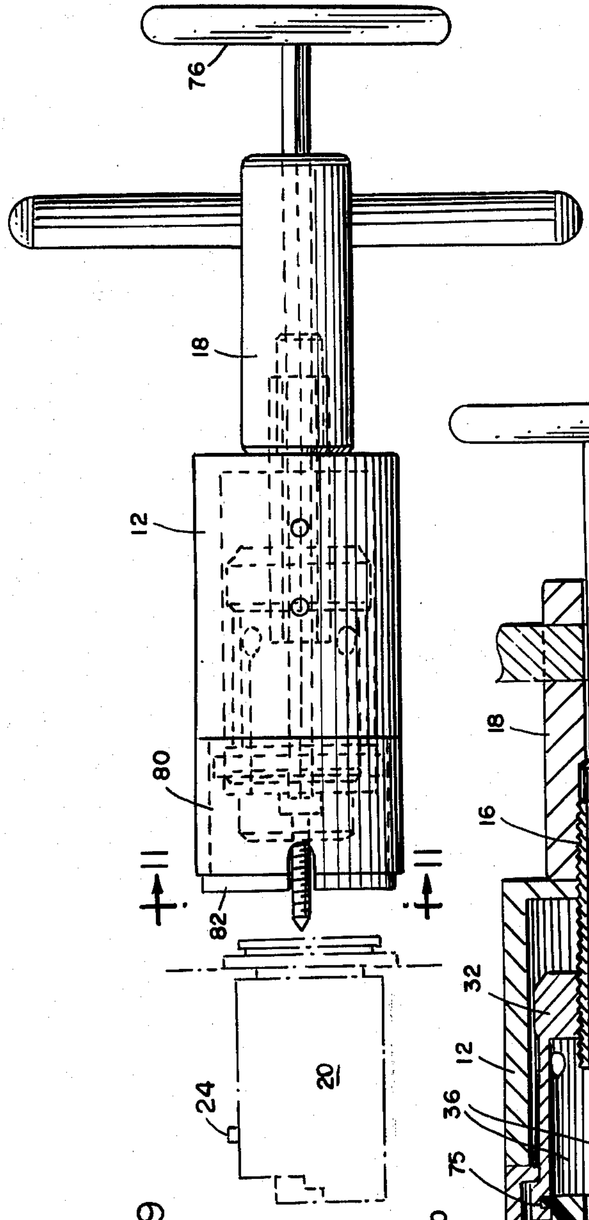
FIG. 9 is a side plan view of a second alternate embodiment of a lock extractor constructed in accordance with the present invention.
Figure 10:
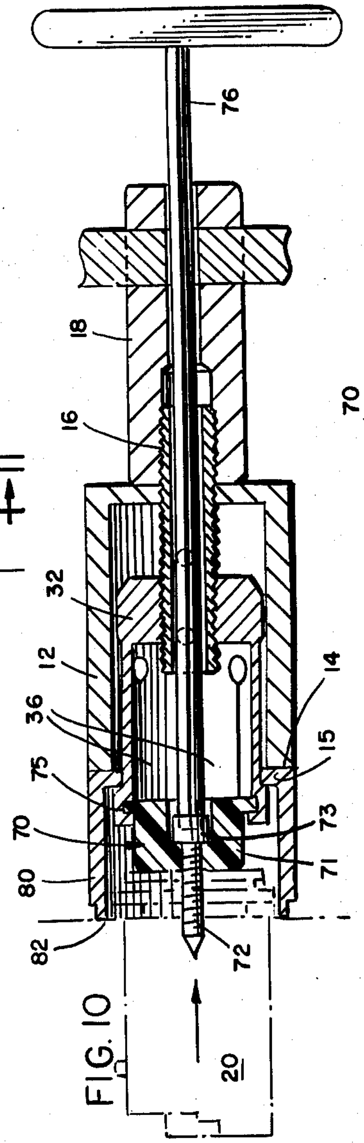
FIG. 10 is a cut-away side view of a portion of the device shown in FIG. 9.
Figure 11:
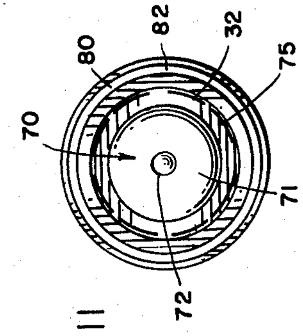
FIG. 11 is an end sectional view taken along line 11—11 of FIG. 9.

A further embodiment of the present invention is generally illustrated in FIGS. 9–11 which is designed to extract locks of the type found in Chrysler Corporation vehicles and many foreign makes. This embodiment is similar to the embodiment shown in FIGS. 5–8 in both structure and general operation with the exception that it has a simple nylon adapter collar 80 attached to ring portion 15 of collar 12 rather than the adapter collar and sleeve assembly described in connection with the above embodiment.

In operation, end portion 82 of collar 80 is seated against the lock assembly frame (not shown) and screw 72 is tapped within the key opening of lock 20. Once the screw is securely engaging the lock, handle 18 is rotated causing the collet adapter assembly and attached lock to withdraw within collar 80 thereby shearing pins 24 securing the lock within the lock assembly. Due to the nylon construction of collar 80, the lock assembly frame surrounding the lock will not be marred during this removal operation.

While several particular embodiments of the present invention have been shown and described, it should be understood that various obvious changes and modifications thereto may be made, and it is therefore intended in the following claims to include all such modifications and changes as may fall within the spirit and scope of this invention.

What is claimed is:

1. A device for extracting the lock from a lock assembly, said device comprising:

a collar having an end surface adapted to engage the lock assembly, said end surface having an inner cam edge;

a threaded shaft positioned within said collar having at one end a handle which bears against said collar;

a collet slidably positioned within said collar having an internally threaded portion which engages said threaded shaft; and a plurality of outwardly biased spring teeth having inwardly projecting engaging portions formed on said collet which surround and loosely engage the lock when said collet is in an extended position wherein the ends of said teeth protrude beyond said collar and said spring teeth having an outer cam surface for engagement with said inner cam edge of said surrounding collar thereby urging said spring teeth to tighten about said lock when the collet is withdrawn within said collar, whereby the turning of said handle will cause the collet to withdraw completely within said collar and thereby extract said lock from the lock assembly.

2. The device of claim 1 wherein the teeth of said collet have an annular groove formed about their outer surface which permits said teeth to be fully outwardly biased when the end portion of said collet is extended from said collar into its extended position.

3. The device of claim 2 wherein said collar has an outwardly extending ring portion formed on its end which aligns said collar end within said lock assembly and about said lock.

4. The device of claim 1 further comprising an adapter assembly, said adapter assembly comprising:

an adapter collar which mounts on the end of said collar adapted to engage the lock assembly; and a collet adapter mounted within said lock engaging means and having a means protruding therefrom for engaging said lock.

5. The device of claim 4 wherein said collet adapter comprises a hollow plug and said protruding lock engaging means comprises a rotatable screw mounted within said plug.

6. The device of claim 5 wherein said threaded shaft and handle have a passage formed therein which permits a means for rotating said screw to be inserted therein.

7. The device of claim 6 wherein said adapter collar is made of nylon.

8. The device of claim 6 further comprising an outwardly biasable adapter sleeve which is removably positioned within said adapter collar in a manner such that it cannot be outwardly biased and which has an end adapted to engage said lock assembly.

9. The device of claim 8 wherein said adapter sleeve and adapter collar have complementary slots formed in their outer wall surfaces which permit portions of said lock assembly to be withdrawn therein.

10. The device of claim 9 wherein said outwardly biasable adapter sleeve is made of nylon.

* * * * *